United States Patent [19]

Asars

[11] Patent Number: 5,126,727
[45] Date of Patent: Jun. 30, 1992

[54] POWER SAVING DRIVE CIRCUIT FOR TFEL DEVICES

[75] Inventor: Juris A. Asars, Murrysville Boro, Pa.

[73] Assignee: Westinghouse Electric Corp., Pittsburgh, Pa.

[21] Appl. No.: 412,241

[22] Filed: Sep. 25, 1989

[51] Int. Cl.⁵ .............................................. G09G 3/30
[52] U.S. Cl. .................... 340/760; 340/781; 340/811
[58] Field of Search ............... 340/760, 781, 811, 812, 340/813, 825.81, 805; 315/169.3

[56] References Cited

U.S. PATENT DOCUMENTS

| | | | |
|---|---|---|---|
| 4,070,663 | 1/1978 | Kanatani et al. | 340/781 |
| 4,535,341 | 8/1985 | Kuhn et al. | |
| 4,707,692 | 11/1987 | Higgins et al. | 340/781 |
| 4,733,228 | 3/1988 | Flegal | 340/805 |
| 4,734,723 | 3/1988 | Ishitobi et al. | |
| 4,823,121 | 4/1989 | Sakamoto et al. | 340/781 |
| 4,922,243 | 5/1990 | Kozicki et al. | 340/813 |
| 4,954,752 | 9/1990 | Young et al. | 340/781 |
| 4,958,105 | 9/1990 | Young et al. | 340/781 |

Primary Examiner—Jeffery A. Brier
Attorney, Agent, or Firm—T. H. Martin

[57] ABSTRACT

A power saving voltage drive circuit for a TFEL edge emitter device of the type having a plurality of pixels, with each pixel having a first terminal and all pixels on a device sharing a common second terminal, is comprised of a demultiplexing channel driver being selectively connected to the second terminal. A bidirectional switch selectively connects one of the first terminals to a source of voltage thereby enabling current to flow into and out of the pixel. A transformer has a primary winding connected between the first terminal and the bidirectional switch for enabling the pixel to charge to an operating voltage, and a secondary winding connected in series with a diode across the source voltage and ground for limiting the value of that operating voltage. The bidirectional switch is operated so that a substantial portion of the energy used to charge the pixel is returned to the source of voltage at the end of the pulse duration.

11 Claims, 4 Drawing Sheets

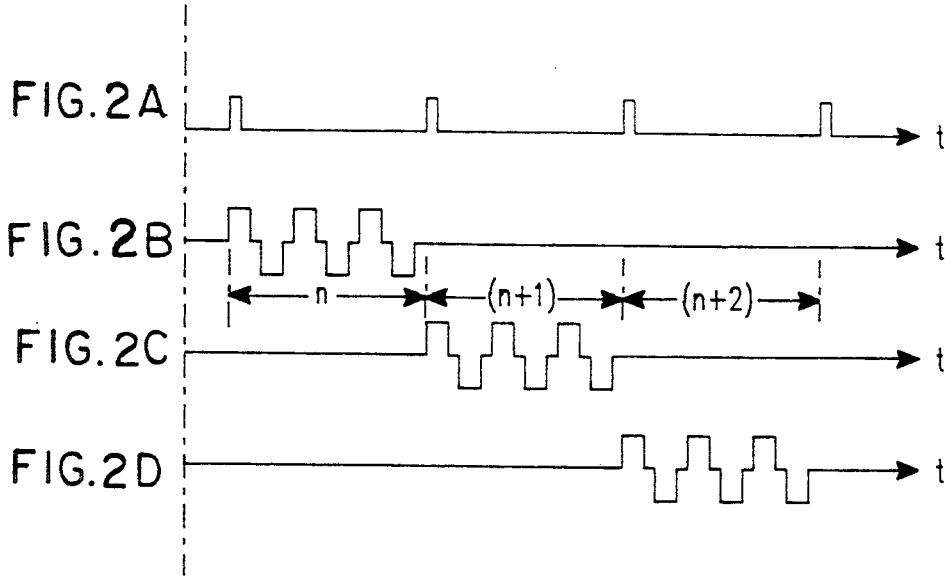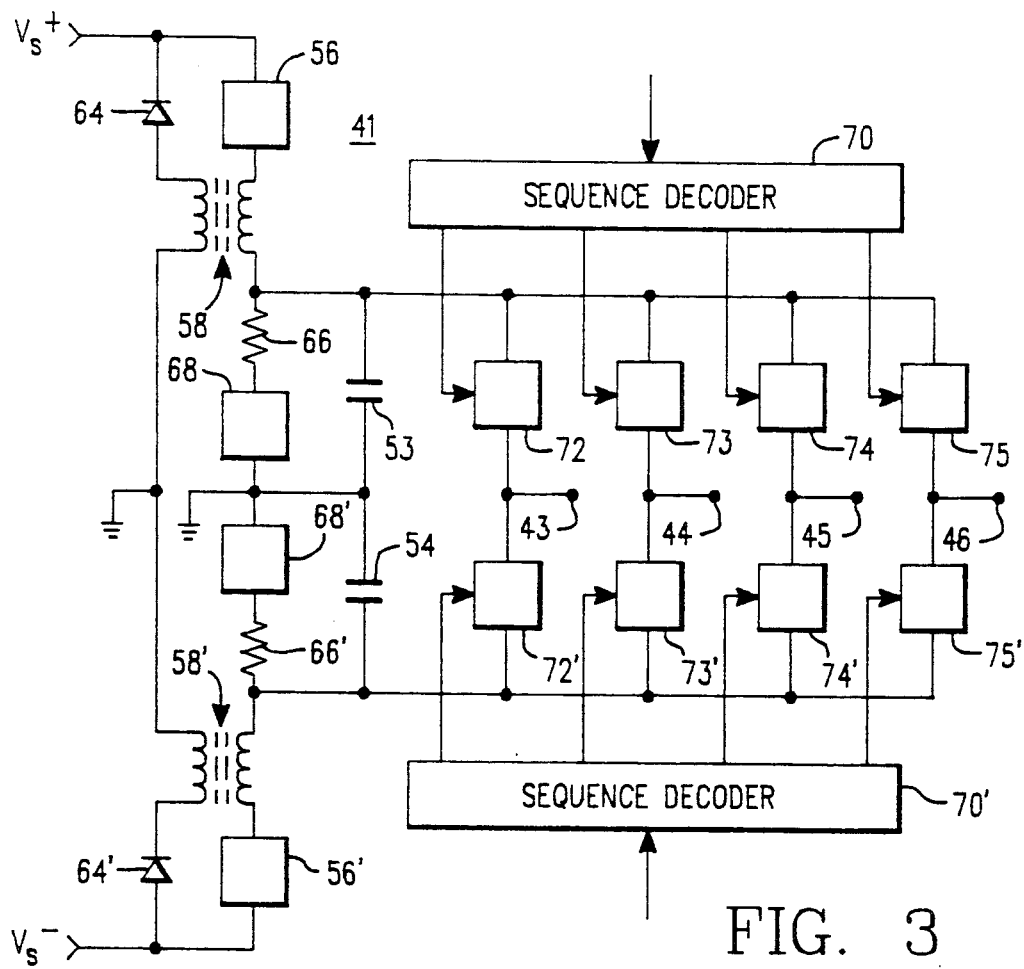

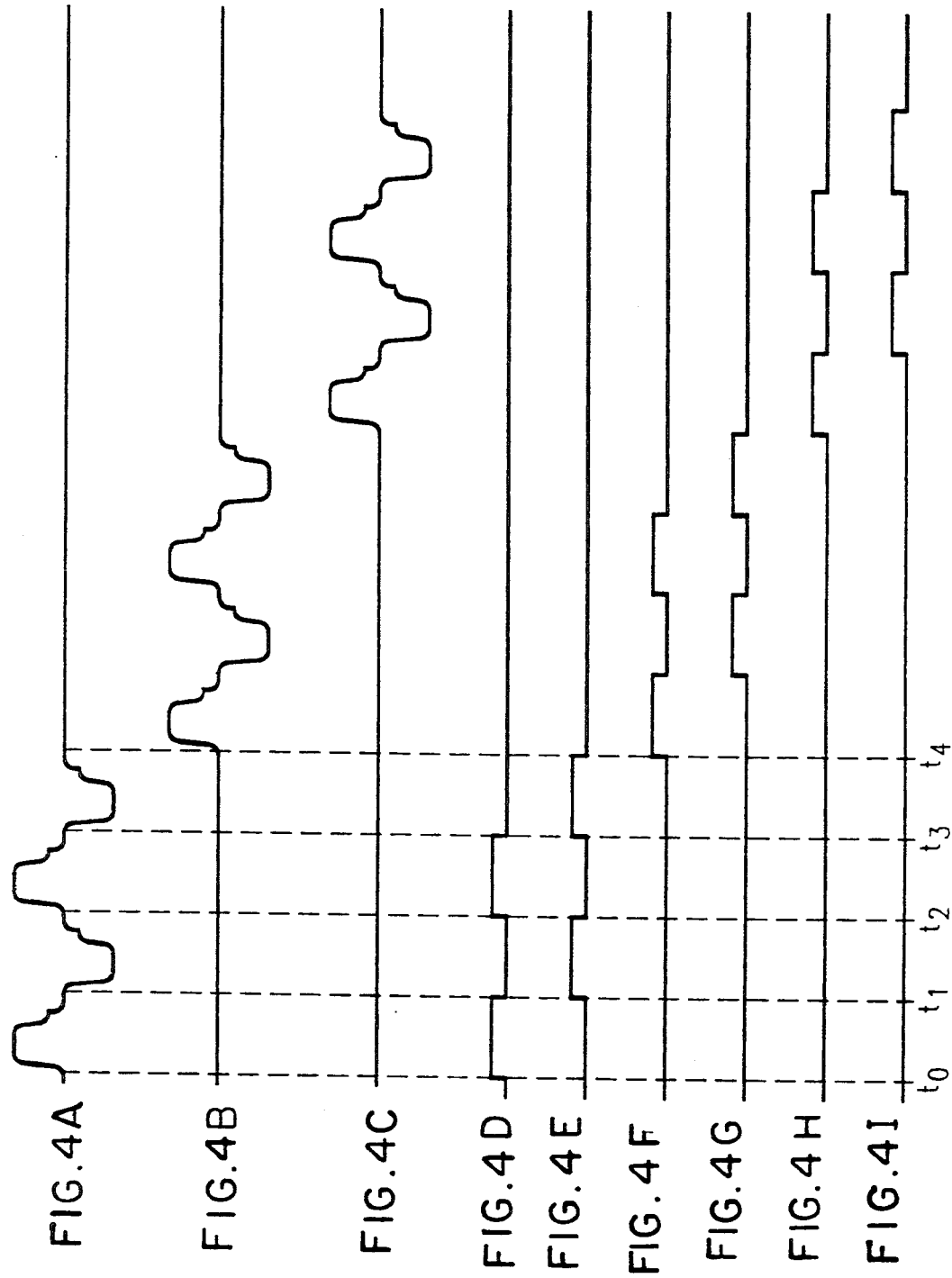

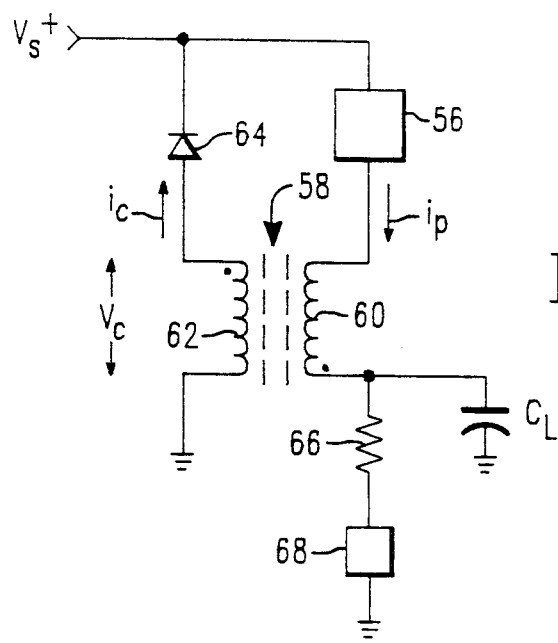
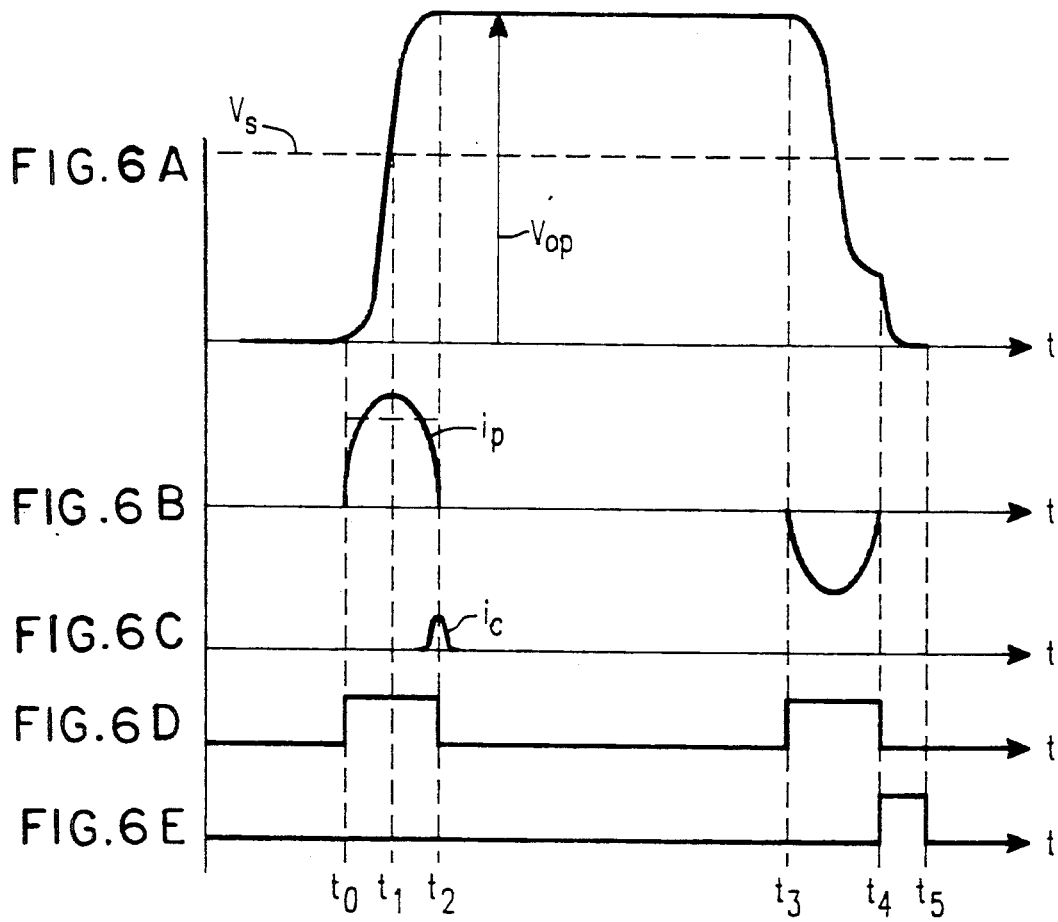
FIG. 5
FIG. 6A
FIG. 6B
FIG. 6C
FIG. 6D
FIG. 6E

POWER SAVING DRIVE CIRCUIT FOR TFEL DEVICES

BACKGROUND OF THE INVENTION

1. Field of the Invention

The present invention is directed generally to drive circuits and more specifically to drive circuits for thin film electroluminescent (TFEL) edge emitter devices.

2. Description of the Prior Art

As is known, TFEL elements emit light when a changing electric field is present across the element. TFEL elements are thin film structures comprised, for example, of a phosphor layer situated between dielectric composite layers and electrodes located on the outside of the dielectric layers. Examples of the structure of TFEL elements are found in U.S. Pat. Nos. 4,535,341, 4,734,723, and U.S. Pat. application Ser. No. 273,296, filed 18 Nov. 1988 now U.S. Pat. No. 5,004,956 and assigned to the same assignee as the present invention.

TFEL edge emitter devices are typically configured in arrays utilizing multiplexed common drive circuitry to control many TFEL devices from a single source. A common driver circuit generates the peak to peak voltage necessary to illuminate the TFEL edge emitter device, and a demultiplexing channel driver directs that signal to the individual devices as desired. Work is being performed to improve edge emitter structures so that fewer physical connections between the individual pixels carried on each device and the driver circuitry are required. An example of such work is U.S. Pat. application Ser. No. 343,697, filed Apr. 24, 1989, now U.S. Pat. No. 4,899,184, and assigned to the same assignee as the present invention.

TFEL devices require large operating voltages on the order of five hundred volts peak to peak. Not only is a high voltage required for operating the device, but the voltage must be precisely regulated to obtain consistent, reproducible, light-emission from the TFEL device. Presently, the common driver circuits use current steering transistors to charge the capacitive TFEL load. The voltage stored in the TFEL load is then discharged by dissipating the power through resistive circuitry. See, for example, FIG. 6 of the aforementioned U.S. Pat. application Ser. No. 343,697 and the accompanying description thereof.

As the applications for TFEL devices increase, and with the potential for portable applications, the need exists for an efficient common drive circuit. In addition to achieving efficient use of supply power, the drive circuit must also be capable of precisely regulating the applied voltage whenever the supply voltage is not precisely controlled.

SUMMARY OF THE INVENTION

The present invention is directed to a power saving voltage drive circuit for a TFEL edge emitter device of the type having a plurality of pixels. Each pixel has a first terminal while all of the pixels on the device share a common second terminal. The drive circuit of the present invention, in its simplest embodiment, is comprised of a demultiplexing channel driver which is selectively connected to the second terminal. A bidirectional switch is provided for selectively connecting one of the first terminals to a source of voltage through an inductance thereby enabling current to flow into the pixel to charge the pixel to an operating voltage and enabling current to flow out of the pixel back to the source of voltage when the pulse is terminated.

According to another embodiment of the present invention, the inductance is provided by the primary winding of a transformer. A secondary winding of the transformer is connected in series with a diode, and that series combination is connected between the source of voltage and ground for limiting the peak value of the operating voltage. Another switch may be provided for grounding the pixel after a substantial portion of the energy stored in the pixel has been returned through the bidirectional switch to the source of voltage.

The present invention is also directed to a method of supplying power to a thin film electroluminescent (TFEL) edge emitter device of the type having a plurality of pixels, each pixel having a first terminal and all pixels on the device sharing a common second terminal. The method, in its simplest form, is comprised of the steps of charging a selected pixel from a source of voltage to an operating voltage through a bidirectional switch and discharging the selected pixel through the bidirectional switch to return the stored energy to the source of voltage.

The circuit and method of the present invention represent a dramatic improvement over the prior art. Experimentally, without circuit optimization, a 66% power savings has been observed. Additionally, due to the particular characteristics of the present invention, the power saving drive circuit automatically stabilizes the operating voltage available to the TFEL devices independently of the characteristics of the TFEL load. Therefore, the present invention achieves uniformity of illumination across TFEL edge emitter array. Those, and other advantages and benefits of the present invention will become apparent from the Description Of A Preferred Embodiment hereinbelow.

BRIEF DESCRIPTION OF THE DRAWINGS

For the present invention to be easily understood and readily practiced, a preferred embodiment will now be described, by way of example only, in connection with the following figures wherein:

FIGS. 2A through 2D illustrate various signals helpful in understanding the operation of the array and drive circuit illustrated in FIG. 1;

FIG. 3 is a schematic representation of the common driver circuit;

FIGS. 4A through 4I illustrate various signals helpful in understanding the operation of the common driver circuit illustrated in FIG. 3;

FIG. 5 is a simplified representation of a portion of the common driver

FIGS. 6A through 6 various signals helpful in understanding the operation of the circuit illustrated in FIG. 5;

FIG. 7 is an electrical schematic of one embodiment of the bidirectional switch illustrated in FIG. 5; and FIG. 8 is a graph illustrating the power savings achieved by the present invention.

DESCRIPTION OF A PREFERRED EMBODIMENT

Figure 1:
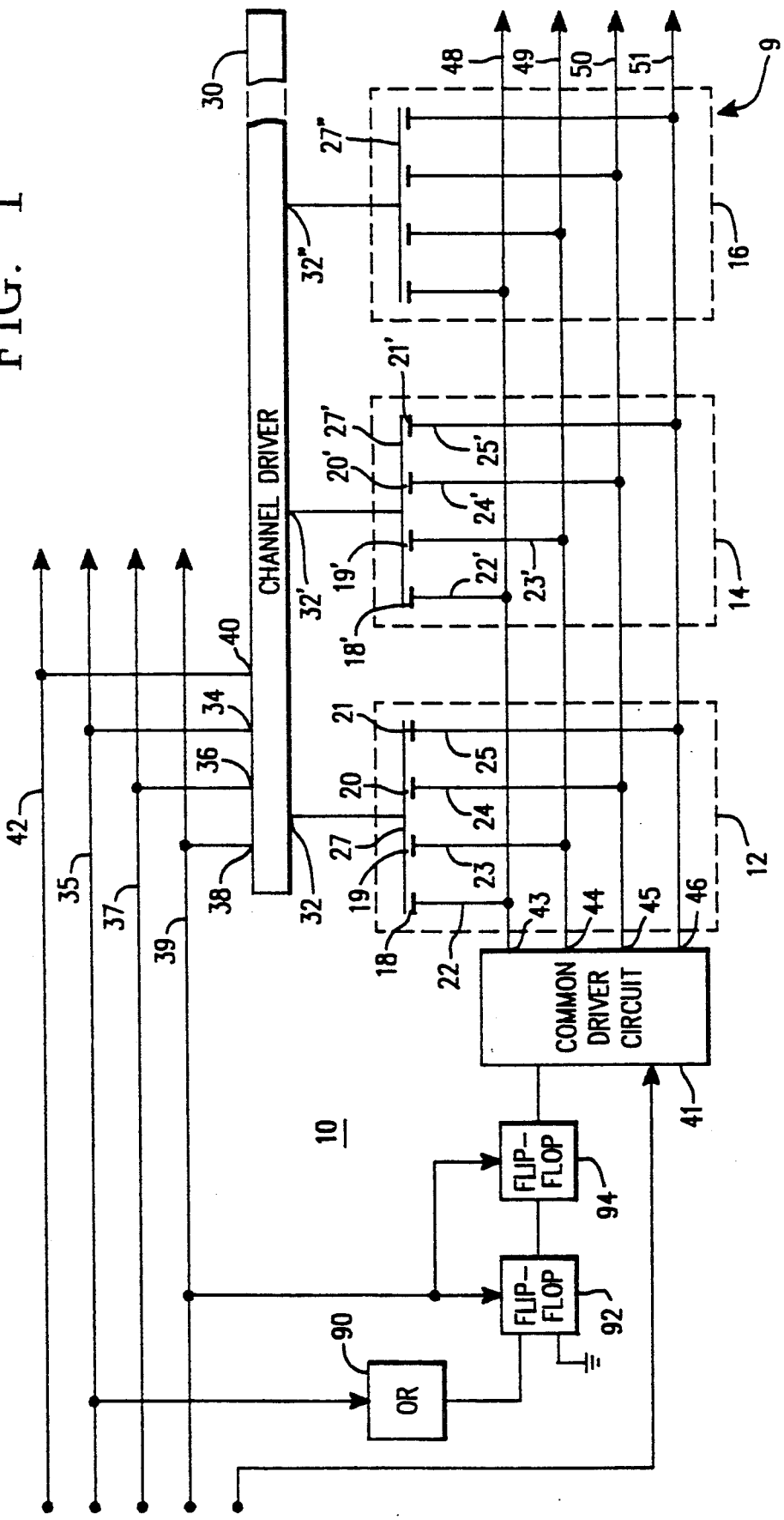
FIG. 1 is a schematic representation of a multiplexed, thin film, electroluminescent (TFEL) edge emitter array comprised of a plurality of TFEL edge emitter devices and/a power saving drive circuit therefor.

FIG. 1 is a schematic representation of a multiplexed, thin film, electroluminescent (TFEL) edge emitter array 9 and a power saving drive circuit 10 therefor. The array 9 is made up of a plurality of identical TFEL devices or pixel groups of which three (12, 14, and 16) are shown. Each of the devices 12, 14, 16 is comprised of a plurality of pixels. In the example shown in FIG. 1, four pixels 18-21 are illustrated on device 12. Each pixel 18-21 has a first terminal 22-25, respectively. All of the pixels 18-21 of the device 12 share a common second terminal 27. All of the TFEL devices 12, 14, 16 comprising the array 9 are constructed in an identical fashion. Thus, for example, the TFEL device 14 has a plurality of pixels 18'-21', each having a first terminal 22'-25', respectively, and each sharing a common second terminal 27'. The construction of such TFEL devices 12, 14, 16 is believed to be well known to those of ordinary skill in the art such that no further description of such devices is necessary.

Each of the common second terminals 27, 27', etc. is connected to a channel driver 30. The channel driver 30 is a commercially available combination shift register, latch, driver device, having a plurality of outputs 32, 32', etc. connected to the common second terminals 27, 27', etc., respectively. Channel driver 30 has a data input terminal 34 for receiving data from a data bus 35, a clock input terminal 36 for receiving clock pulses from a clock bus 37, a latch input terminal 8 for receiving latching commands from a latch bus 39, and a polarity input terminal 40 for receiving polarity signals from a polarity bus 42. The provision of data, clock pulses, latching instructions, and polarity signals to the channel driver 30 is well known in the art. The reader desiring more information concerning the construction and operation of the channel driver 30 is directed to the aforementioned U.S. Pat. application Ser. No. 343,697, which is hereby incorporated by reference.

The drive circuit 10 illustrated in FIG. 1 also includes a common driver circuit 41. The common driver circuit 41 has a first output terminal 43 connected to a first bus bar 48, a second output terminal 44 connected to a second bus bar 49, a third output terminal 45 connected to a third bus bar 50, and a fourth output terminal 46 connected to a fourth bus bar 51. Each of the bus bars 48-51 is connected to one of the first terminals of each of the TFEL devices 12, 14, 16. For example, first bus bar 48 is connected to first terminals 22, 22', etc., second bus bar 49 is connected to first terminals 23, 23', etc., third bus bar 50 is connected to first terminals 24, 24', etc., and fourth bus bar 51 is connected to first terminals 25, 25', etc. In that manner, the common driver circuit 41 can provide power to all of the pixels of each of the TFEL devices. The common driver circuit 41, when operated in conjunction with the channel driver 30, which acts as a demultiplexor, enables individual pixels to be energized as is known.

The construction and operation of the common driver circuit 41 forms an important part of the present invention and will now be described in detail in conjunction with FIGS. 3, 4A-4I, 5, and 6A-6E.

Turning to FIG. 3, the common driver circuit 41 is illustrated in detail. The circuit to the left of capacitors 53 and 54 provides positive and negative voltage pulses which are then steered by the circuitry to the right of capacitors 53 and 54 such that trilevel signals as shown in FIG. 4A are available at output terminal 43, trilevel signals as shown in FIG. 4B are available at output terminal 44, trilevel signals as shown in FIG. 4C are available at output terminal 45, and similar trilevel signals (not shown) are available at output terminal 46. The circuit to the left of capacitors 53 and 54 is a dual circuit with the top half and bottom half being identically constructed. The top half may be used to provide the positive portion of the trilevel signals while the bottom half may be used to provide the negative portion of the trilevel signals. The operation of the circuitry to the left of capacitors 53 and 54 is described in greater detail in conjunction with FIG. 5.

In FIG. 5, the upper half of the circuit to the left of capacitors 53 and 54, which is responsible for producing the positive portion of the trilevel signal, is illustrated in detail. The circuitry to the right of capacitors 53 and 54 has been simplified and is represented simply by the capacitive load $C_L$.

The capacitive load $C_L$ is connected to a source of positive volta $V_s$ through the series combination of a high speed, bidirectional switch 56 and a primary winding 60 of a transformer 58. A secondary winding 62 of the transformer 58 is series connected with a diode 64 between the positive voltage source $V_s$ and ground. The capacitive load $C_L$ is connected to ground through the series combination of a resistor 66 and switch 68. The operation of the circuitry shown in FIG. 5 will now be described in combination with FIGS. 6A-6E.

At time $t_0$ in FIG. 6D, bidirectional switch 56 is closed. The load capacitor $C_L$ begins to charge due to the flow of current $i_p$ (shown in FIG. 6B) through the inductance of the primary winding 60 of the transformer 58. The load capacitor $C_L$ begins to charge as an ordinary LC circuit as shown in FIG. 6A. At this time, diode 64 is back biased such that no current $i_c$ flows through the secondary or control winding 62 of the transformer 58 as shown in FIG. 6C. The current flowing through the primary winding 60 continues to increase until time $t_1$ when the voltage of the load capacitor $C_L$ equals the source voltage $V_s$. Thereafter, the value of the current $i_p$ begins to decrease as shown in FIG. 6B.

At time $t_2$, the voltage across the load capacitor $C_L$ has achieved an operating potential as shown by $V_{op}$ in FIG. 6A. As the voltage across the load capacitor $C_L$ reaches the operating voltage $V_{op}$, the voltage $V_c$ across the control winding 62 exceeds the source voltage $V_s$ resulting in the flow of current $i_c$ shown in FIG. 6C. That flow of current diverts the energy remaining in the transformer 58 back to the power source thereby limiting the amplitude of the operating voltage $V_{op}$. At time $t_2$, the switch 56 is open as shown in FIG. 6D to prevent the discharge of the capacitive load $C_L$.

The maximum value of the operating voltage $V_{op}$ is independent of the variations in capacitive load characteristics and therefore stable regardless of the number of pixels in the "on" state at any given time. $V_{op}$ is the sum of the voltage across the primary winding, which is determined by the equation for an ideal transformer, and the source voltage $V_s$ as follows:

$$V_{op} = (1 + N_p/N_c)V_s$$

where $N_p$ equals the number of turns on primary winding 60 and $N_c$ equals the number of turns on secondary winding 62.

From time $t_2$ until $t_3$, the operating voltage is maintained due to switch 56 being open as shown by FIGS. 6A and 6D. After the desired pulse duration, switch 56 is closed as shown by FIG. 6D. That allows the current to flow in the opposite direction from the capacitive load $C_L$ as shown in FIG. 6B which results in the discharging of the load as shown by FIG. 6A. A substantial portion of the energy stored in the capacitive load $C_L$ is returned to the source of voltage. However, due to losses in the circuit, $C_L$ may not be completely discharged. Therefore, at time $t_4$ switch 56 is open and switch 68 is closed as shown in FIGS. 6D and 6E, respectively. When switch 68 is closed, the load capacitor $C_L$ is grounded through the resistor 66 thereby allowing the residual energy to be dissipated and the charge on the capacitor reduced to zero as shown in FIG. 6A. When the residual energy remaining in the load capacitor $C_L$ has been dissipated, the switch 68 is closed at time $t_5$ as shown in FIG. 6E. It is also possible to recover a portion of the residual energy dissipated by resistor 66 although no circuitry is shown in FIG. 5 to implement such a recovery. Those of ordinary skill in the art will recognize that from time $t_0$ to time $t_5$, channel driver 30 is operative to appropriately connect the common second terminal of the pixel being illuminated.

As previously discussed, the circuit shown in FIG. 5 generates one-half of a cycle of the trilevel peak-to-peak waveform necessary for the illumination of a pixel. For that reason, and as shown in FIG. 3, the common driver circuit 41 consists of two circuits of the type shown in FIG. 5 operating out of phase, in a complimentary fashion, to generate the necessary trilevel signal. In FIG. 3, the components providing the negative half cycle of the trilevel waveform are given like reference numerals and are distinguished by the prime designation.

After the positive and negative portions of the trilevel signal are generated, appropriate circuitry is provided to steer those signals to the appropriate output terminals. Such steering circuitry is shown to the right of capacitors 53 and 54 and may be comprised of a sequence decoder 70, responsive to external logic, for operating a plurality of switches 72 through 75. A sequence decoder 70' for operating a plurality of switches 72'-75' is similarly provided for the negative portion of the cycle.

The switches 72-75 and 72'-75' are operated by sequence decoders 70 and 70' respectively, to provide the waveforms illustrated in FIGS. 4A-4C. At time $t_0$, switch 72 is closed as shown in FIG. 4D thereby allowing the positive portion of the waveform to be conducted to output terminal 43. All of the other switches are open such that the voltage available at output terminals 44 and 45 is zero as shown in FIGS. 4B and 4C. At time $t_1$ switch 72 is open and switch 72' is closed as shown in FIGS. 4D and 4E, respectively, thereby allowing the negative half cycle of the waveform to be conducted to output terminal 43. At time $t_2$, switch 72' is open and switch 72 is closed thereby allowing another positive half cycle of the waveform to be conducted to output terminal 43. At time $t_3$, the positions of the switches are again reversed enabling another negative half cycle to be conducted to the output terminal 43. At time $t_4$, switches 73 and 73' are similarly operated while switches 72, 72', 74, 74', etc. remain open. Thus, through appropriate manipulation of the steering switches, the trilevel waveforms shown in FIGS. 4A-4C appear at output terminals 43-45, respectively.

One cycle of the signal shown, for example, in FIG. 4A, from time $t_0$ to time $t_2$ is approximately thirteen microseconds. Therefore, the bidirectional switch 56, in addition to being capable of conducting current in both directions, must also be capable of extremely rapid switching. One example of a high speed, bidirectional switch, which may be used for switch 56, is illustrated in FIG. 7.

In FIG. 7, switch 56 is comprised of two back-to-back MOSFET transistors 72 and 74, with appropriate blocking diodes 76 and 78, respectively. The gate of the transistor 72 is connected to the junction between a resistor 80 and a capacitor 82 which are connected in series across the voltage source $V_s$. Similarly, the gate of the transistor 74 is connected to the junction between a resistor 84 and a capacitor 86 which are connected in series across the voltage source $V_s$. Appropriate control signals are provided to render one or the other transistor 72, 74 conductive. Also shown in FIG. 7 is a MOSFET transistor 88 used for the switch 68.

The MOSFET transistors 72 and 74 were used to demonstrate the feasibility of the present invention because such components are cheap and readily available whereas high-speed triacs and silicon controlled rectifiers (SCRs) are not so readily available. However, those of ordinary skill in the art will recognize that a suitable high-speed, bidirectional switch 56 may also be constructed of a triac, a photo-triac (both of which are bidirectional devices), two back-to-back silicon controlled rectifiers, or two back-to-back photo-silicon controlled rectifiers.

Results achieved with the circuit shown in FIG. 7 are illustrated in FIG. 8. Pertinent data is as follows: the number of primary turns equals twenty; the number of secondary turns equals thirty-six; pulse repetition rate is fifty microseconds (20 k Hz), and the pulse duration period is five microseconds.

The value for the parameter D, which is representative of the efficiency of the circuitry, is represented by the following equation:

$$D = (2V_s I_s T) (C_L V_{op}^2)$$

where
$V_s$ = Supply voltage in volts
$I_s$ = Supply current in milliamps
$T$ = pulse repetition period
$C_L$ = capacitive value of the load
$V_{op}$ = operating voltage In an experiment under conditions similar to those for present edge emitter common drivers, the edge emitter common driver 41 of the present invention, without circuit optimization, dissipated approximately 66% less power than currently used prior art drivers for which the D value is greater than two.

Returning now to FIG. 1, for TFEL edge emitter arrays 9 where low power consumption is important, a considerable amount of energy can be saved by inhibiting the common driver 41 during periods when all the TFEL devices are in the "off" state. Such a condition can exist in an edge emitter printer-type application during the blank period between lines on a page or during the printing of a gray scale area. Such an energy saving concept is possible because during any burst period, the information for the next burst period is already being supplied from the data source to the channel driver 30.

In FIG. 2A, the latching signal available on latch bus 39 is illustrated. At the time one burst (n) is being displayed, information for the next burst (n+1) is being serially loaded into the hold devices within channel driver 30. Thus, the composition of the next burst (n+1) is known. If it is determined that all the pixels during the next burst (n+1) will not be required to emit light, then the production of the signal shown in FIG. 2B corresponding to that burst can be inhibited.

Because the common driver circuit 41 and channel driver 30 operate synchronously, implementation of a common driver 41 disabling circuit can be achieved with minimal modifications. Such a disabling circuit can be constructed as shown in FIG. 1 of an OR gate 90 which is responsive to the data on data bus 35. Whenever the data indicates that all of the pixels are to be blank, a signal is provided to a first flip-flop 92, which propagates through a second flip-flop 94, to inhibit the common driver circuit 41. The flip-flops 92 and 94 are reset by the latch signal shown in FIG. 2A. In that manner, whenever all of the pixels are to be blank, the common driver circuit 41 is inhibited from producing the trilevel output signal on one of the buses 48-51. That represents a significant power savings.

The present invention is also directed to a multiplexed method of delivering power to the TFEL edge emitter array 9 of the type constructed of a plurality of TFEL devices 12, 14, 16, wherein each device carries a plurality of pixels 18-21, 18'-21', etc. Each pixel has a first terminal 22-25, 22'-25', etc. and all pixels on a device share a common second terminal 27, 27', etc. The method is comprised of the steps of selectively supplying a data signal to at least one of the second terminals, for example, second terminal 27, from the demultiplexing channel driver 30. At the same time, at least one of the first terminals, for example, first terminal 22, is selectively connected to the source of voltage through the bidirectional switch 56 and primary-winding 60 of the transformer 58, thereby enabling current to flow into the selectively connected pixel, pixel 18. When the pixel 18 has charged substantially to the operating voltage $V_{op}$, the switch 56 is open thereby preventing the pixel 18 from discharging. After an appropriate pulse duration, the selected first terminal, in this example terminal 22, is reconnected to the source of voltage through bidirectional switch 56 to enable current to flow from the charged pixel to the source of voltage. Thereafter, bidirectional switch 56 is open and the switch 68 is closed thereby grounding the pixel 18 after substantially all of the energy stored to the pixel has been returned to the source of voltage. Finally, switch 68 is open and the data signal is removed from second terminal 27 by demultiplexing driver 30.

The edge emitter common driver 41 of the present invention utilizes reactive circuitry to conserve the energy stored in the TFEL load during charging by redirecting the energy back into the power source when discharging the load instead of dissipating the power through resistive circuitry. Novel operation of the drive circuit 10 to disable the common driver circuit 41 during blank periods enables additional power savings. The power savings achieved by the present invention opens up new applications for TFEL arrays. As such, the present invention represents a substantial advance over the prior art.

The present invention has been described in conjunction with an exemplary embodiment thereof. Those of ordinary skill in the art will recognize that many modifications and changes may be made. All such modifications and changes are intended to be included within the scope of the foregoing description and the following claims.

What I claim is:

1. A power saving voltage drive circuit for a thin film electroluminescent (TFEL) edge emitter device of the type having a plurality of pixels, each pixel having a first terminal and all pixels sharing a common second terminal, said drive circuit comprising:

demultiplexing means selectively connectable to the second terminal;

a transformer having a primary winding means and a secondary winding means, said secondary winding means inductively coupled to said primary winding means and a diode means, said secondary winding means and said diode means being connected in series across a source voltage and a ground for limiting the value of the operating voltage;

bidirectional switch means connected in series with said primary winding means;

steering means for selectively connecting one of the first terminals to said source voltage through said primary winding means and said bidirectional switch means thereby enabling current to flow into the pixel to charge the pixel to an operating voltage and enabling current to flow out of the pixel back to the source of the voltage.

2. The drive cicrcuit of claim 1 additionally comprising switch means for grounding the pixel after a substantial portion of the energy stored in the pixel has been returned to the source of voltage.

3. The drive circuit of claim 1 wherein said bidirectional switch means includes first and second transistors and first and second diodes interconnected such that said first transistor is conductive when said second transistor is nonconductive to enable current to flow into the TFEL device and said first transistor is nonconductive when said second transistor is conductive to enable current to flow out of the TFEL device.

4. The drive circuit of claim 1 wherein said bidirectional switch means includes a triac.

5. The drive circuit of claim 1 wherein said bidirect switch means includes a phototriac.

6. The drive circuit of claim 1 wherein said bidirectional switch means includes first and second SCRs interconnected such that said first SCR is conductive when said second SCR is nonconductive to enable current to flow into the TFEL device and said first SCR is nonconductive when said second SCR is conductive to enable current to flow out of the TFEL device.

7. The drive circuit of claim 1 wherein said bidirectional switch means includes first and second photo SCR's interconnected such that said first photo SCR is conductive when said second photo SCR is nonconductive to enable current to flow into the TFEL device and said first photo SCR is nonconductive when said second photo SCR is conductive to enable current to flow out of the TFEL device.

8. A multiplexed thin film electroluminescent (TFEL) edge emitter array and power saving drive circuit therefor, comprising;

a plurality of TFEL edge emitter devices, each device having a plurality of pixels, each pixel of each device having a first terminal and sharing a common second terminal with the other pixels of that device;

transformer means having a primary and secondary winding;

bidirectional switch means connected in series with said primary winding;

steering means for selectively connecting certain of said first terminals through said primary winding and said bidirectional switch means to a source of voltage;

diode means connected in series with said secondary winding between the source of the voltage and ground for limiting the value of an operating voltage; and demultiplexing means selectively connectable to certain of said second terminals of said devices to enable a pixel on the selected device to charge to said operating voltage and discharge from said operating voltage through said bidirectional switch means and said primary winding.

9. The array and drive circuit of claim 8 wherein said operating voltage is determined by the turns ratio of said transformer means and the source voltage.

10. A method of delivering multiplexed power to a thin film electroluminescent (TFEL), edge emitter array of the type constructed of a plurality of TFEL devices, each device having a plurality of pixels, each pixel having a first terminal, and all pixels on a device sharing a common second terminal, said method comprising the steps of:

selectively supplying a data signal to at least one of the second terminals from a demultiplexing driver;

selectively connecting at least one of the first terminals to a source of voltage through a bidirectional switch and a primary winding of a transformer thereby enabling current to flow into the selectively connected pixel to enable the pixel to charge to an operating voltage;

inductively coupling a secondary winding of said transformer to said primary and a diode, said secondary winding and said diode being connected in series across a source voltage and a ground for limiting the value of the operating voltage;

disconnecting said at least one of the first terminals from the source of the voltage thereby preventing the pixel from discharging;

reconnecting said at least one of the first terminals to the source of the voltage after an appropriate pulse duration to enable current to flow from the charged pixel to the source of voltage;

disconnecting said at least one of the first terminals from the source of the voltage after substantially all of the energy stored in the pixel is returned to the source of voltage; and removing the data signal from said at least one of the second terminals.

11. The method of claim 10 additionally comprising the step of grounding the pixel after substantially all of the energy stored in the pixel has been returned to the source of voltage.

* * * * *